United States Patent
Armentrout

[11] Patent Number: 5,651,999
[45] Date of Patent: Jul. 29, 1997

[54] APPARATUS FOR TESTING EXTRUDED TUBING

[75] Inventor: Charles J. Armentrout, Ann Harbor, Mich.

[73] Assignee: Pilot Industries, Inc., Dexter, Mich.

[21] Appl. No.: 515,272

[22] Filed: Aug. 15, 1995

[51] Int. Cl.⁶ .................................................. B29C 47/92
[52] U.S. Cl. .................... 425/169; 425/815; 264/40.1; 73/866
[58] Field of Search .................. 425/169, 380, 425/815, 71, 378.1; 264/40.1, 209.4, 85; 73/866, 40.7

[56] References Cited

U.S. PATENT DOCUMENTS

| | | | |
|---|---|---|---|
| 2,948,919 | 8/1960 | Matthews . | |
| 3,580,052 | 5/1971 | Young | 73/40.7 |
| 3,592,048 | 7/1971 | Maurice et al. | 73/40.7 |
| 3,704,083 | 11/1972 | Phipps | 425/71 |
| 3,821,339 | 6/1974 | Johnson | 264/40 |
| 4,517,828 | 5/1985 | Miller et al. | 73/46 |
| 4,557,139 | 12/1985 | Contwell et al. | 73/40.7 |
| 4,601,194 | 7/1986 | Miller et al. | 73/40.7 |
| 5,288,441 | 2/1994 | Collins | 264/40.2 |
| 5,376,927 | 12/1994 | Kidd | 340/522 |
| 5,441,394 | 8/1995 | Keilert et al. | 425/71 |
| 5,525,049 | 6/1996 | Paletta | 425/335 |

OTHER PUBLICATIONS

"Introduction to Fuel System Leak Detection Products," EG&G Automotive Research advertisement.
"FSLDP-1 Fuel System Leak Detector," EG&G Automotive Research Order Form.

*Primary Examiner*—Jay H. Woo
*Assistant Examiner*—Iurie A. Schwartz
*Attorney, Agent, or Firm*—Gifford, Krass, Groh, Sprinkle, Patmore, Anderson & Citkowski, P.C.

[57] ABSTRACT

An apparatus is disclosed for testing the integrity of tubing formed by extruding material through an extrusion die. The apparatus includes a source of helium gas which is fluidly connected to the extrusion die so that helium gas is continuously introduced into the interior of the tube as it is formed during the extruding process. The extruded tubing is passed through an elongated inspection housing open at each end. The inspection housing has a cross-sectional inside shape greater than the cross-sectional shape of the tubing thus forming an annular chamber between the tubing and the interior of the inspection housing. A helium detector constantly monitors the atmosphere within the annular chamber and, whenever helium is detected, indicative that the tubing has a leak or the fault, activates an alarm.

9 Claims, 2 Drawing Sheets

APPARATUS FOR TESTING EXTRUDED TUBING

BACKGROUND OF THE INVENTION

1. Field of the Invention

The present invention relates generally to inspection devices and, more particularly, to an inspection device for inspecting extruded tubing.

2. Description of the Prior Art

Many types of tubing are formed by an extrusion process. In an extrusion process, semi-molten material is forced through an extrusion die which forms both the outside and inside diameter of the tube. The tubing itself is formed of any extrudable material.

Due to the forces imposed upon the tubing during the extrusion process, holes are periodically formed in the tubing. Furthermore, in some instances, the tubing passes through a convoluter which in turn subjects the extruded tubing to still further stresses which can result in holes in the tubing.

In most, if not all, applications, it is necessary to identify and eliminate tubing having holes in it as defective tubing. However, where the defects or holes are very small, e.g. pin holes, the previously known visual inspection methods have not proven wholly satisfactory. Furthermore, there are no tubing inspection devices known to the inventor which automatically inspect the tubing as it is extruded through the extrusion die.

SUMMARY OF THE INVENTION

The present invention provides an apparatus for testing tubing formed by extruding material through an extrusion die which overcomes all of the above-mentioned disadvantages of the previously known devices.

In brief, the apparatus of the present invention comprises a source of a predetermined gas, such as helium. The helium gas is fluidly connected by a fluid conduit which extends through the extrusion die such that one end of the fluid conduit is open to the downstream end of the extrusion die and thus to the interior of the tubing formed by the extrusion die.

After the tubing is extruded, the tubing is passed through an elongated inspection housing which is open at each end. Preferably the exit end of the inspection housing is positioned below the water level of a cooling tank. The housing has a greater cross-sectional area than the cross-sectional area of the extruded tubing so that an annular chamber is formed between the interior of the inspection tunnel and the exterior of the tubing.

A helium detector is fluidly connected by a fluid conduit to the annular chamber of the inspection housing so that the helium detector continuously sampled the atmosphere within the annular chamber. In the event that the helium detector detects helium, indicative of a leak in the tubing, the helium detector generates an output signal. In the preferred embodiment of the invention, the output signal activates an alarm so that workers can take the appropriate action to eliminate the defective tubing.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
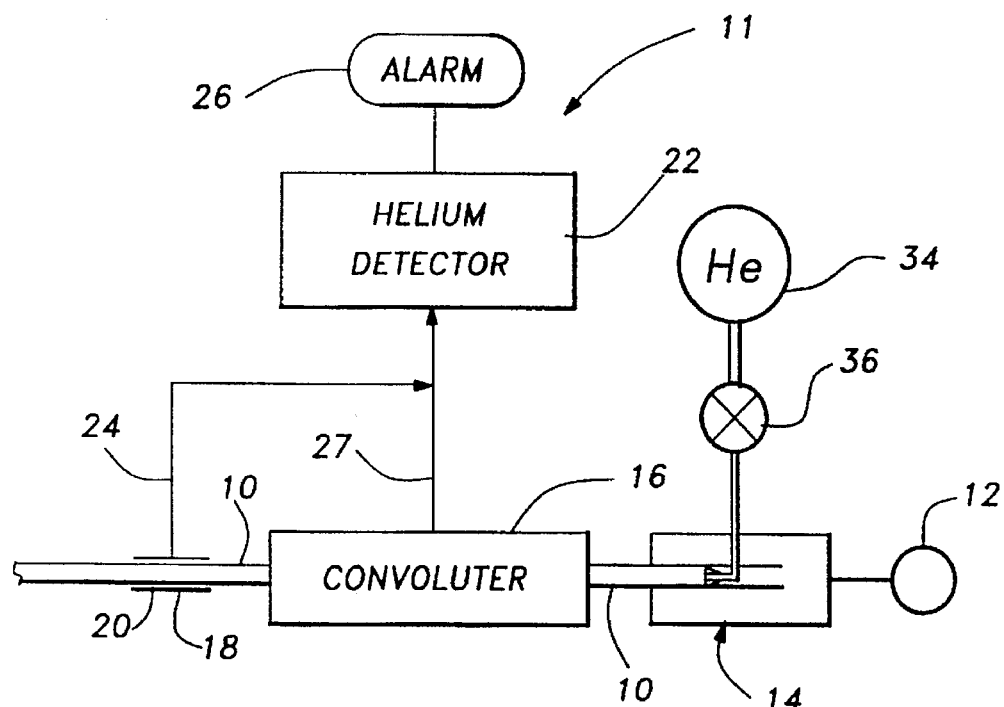
FIG. 1 is a block diagrammatic view illustrating a preferred embodiment of the present invention.

With reference first to FIG. 1, a block diagrammatic view of the apparatus 11 of the present invention is there shown for testing the integrity of tubing 10 for leaks. The tubing 10 is an extruded tubing and, as such, a source 12 of extrudable material is forced through an extrusion die 14 which forms the tubing. The extruded tubing 10 then optionally passes through a convoluter 16 immediately downstream from the extrusion die 14.

The testing apparatus 11 includes an elongated inspection housing 18 open at each end and through which the extruded tubing 10 passes. Consequently, the end section housing 18 has an inside cross-section shape greater than the outer cross-sectional shape of the tubing 10 thus forming an annular chamber 20 within the housing 18. This annular chamber 20 is formed between the outside of the tubing 10 and the inside of the housing 18.

A detector 22 for detecting the presence of a predetermined type of gas, such as helium, is fluidly connected by a fluid conduit 24 to the annular housing chamber 20. In the event that the gas detector 22 detects the presence of the predetermined gas in the housing chamber 20, the gas detector 22 generates an output signal and optionally activates an alarm 26.

Still referring to FIG. 1, in the event that the convoluter 16 is positioned in between the inspection housing 18 and the extrusion die 14, the gas detector 22 is also preferably fluidly connected to the interior of the convoluter 16 by a further fluid conduit 27. The purpose of this further fluid conduit 27 will be subsequently described in greater detail.

Figure 2:
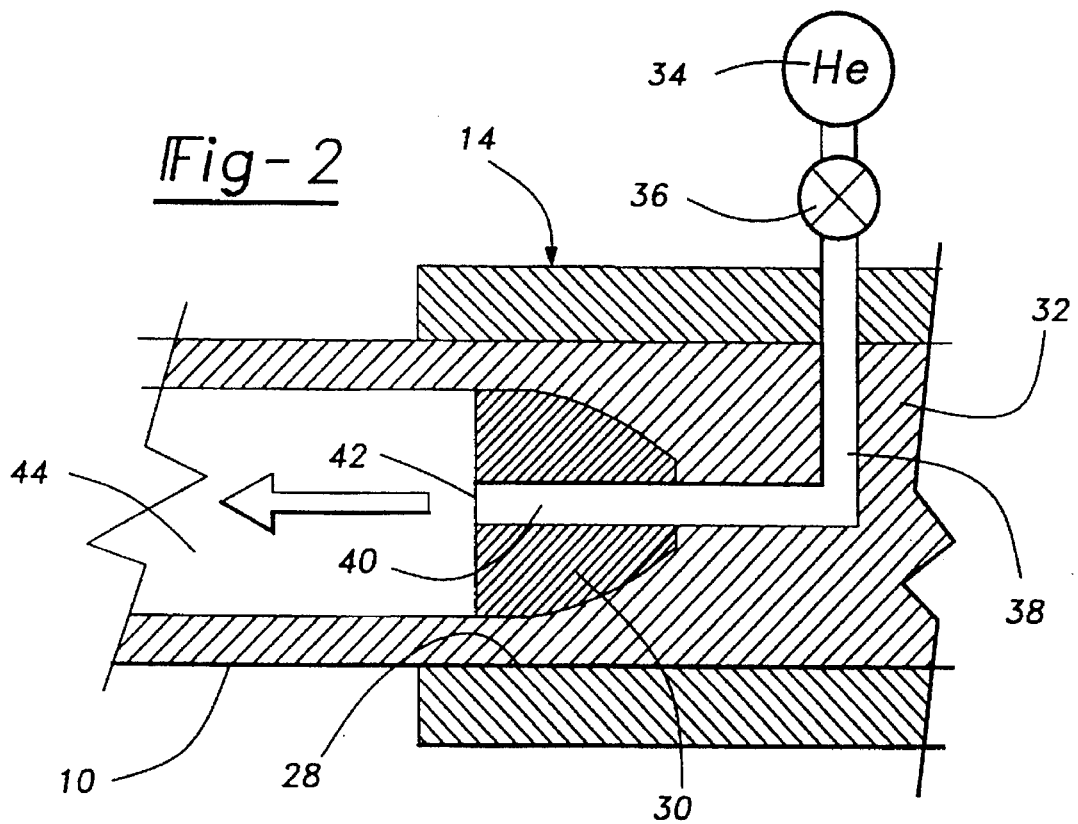
FIG. 2 is a fragmentary longitudinal sectional view illustrating one portion of the preferred embodiment of the present invention.

With reference now particularly to FIG. 2, the extrusion die 14 is there shown in greater detail and includes an outer die surface 28 which corresponds to the outer periphery of the tubing 10. For example, assuming that the tubing 10 is circular in cross-sectional shape, the die surface 28 is also circular in shape.

The die 14 also includes an insert 30 around which the extruded material 32 is forced. The outer periphery of the die insert 30 corresponds to the inside periphery of the tube 10.

A source 34 of the predetermined gas is fluidly connected through a pressure regulator 36 and a fluid conduit 38 so that a portion 40 of the fluid conduit 38 extends through the die insert 30 and is open as shown at 42 to the interior 44 of the tubing 10 at the downstream side of the die insert 30. Thus, by this configuration, the gas source 34 continually supplies the predetermined gas into the interior of the tubing 10 as it is formed by the extrusion die 14.

In operation, the predetermined gas continuously supplied to the interior 44 of the tubing 10 during the extrusion process. In the event that the tube has a leak in it, the predetermined gas leaks out through the opening and into the annular chamber 20 formed in the inspection housing 18.

Once the predetermined gas enters the annular chamber 20 of the inspection housing 18, the gas detector 22 senses the presence of the predetermined gas and generates the appropriate output signal, such as activation of the alarm 26.

Appropriate action can then be taken to eliminate the defective portion of the tubing 10.

As is well known, in the event that the convoluter 10 is operatively disposed between the extrusion die 14 and the inspection housing 18, the convoluter 16 necessarily imposes great forces and stresses upon the tubing 10. In some cases, relatively large openings are formed in the tubing 10. Indeed, in some cases, the openings in the tubing 10 are so large that the gas from the source 34 escapes from the tubing 10 inside the convoluter 16 and never reaches the inspection housing 18.

The fluid conduit 27 fluidly connected between the gas detector 22 and convoluter 16, however, effectively detects the presence of gas in the convoluter which, itself, is an indication of an opening in the tubing 10. Consequently, the fluid conduit 27 ensures that large openings in the tubing 10 are detected which might not otherwise be detected by the inspection housing 18.

In the preferred embodiment, the source 34 of gas essentially comprises helium and, similarly, the gas detector 22 is a helium detector. Other gases, however, may alternatively be used without deviation from the spirit or scope of the invention.

Figure 3:
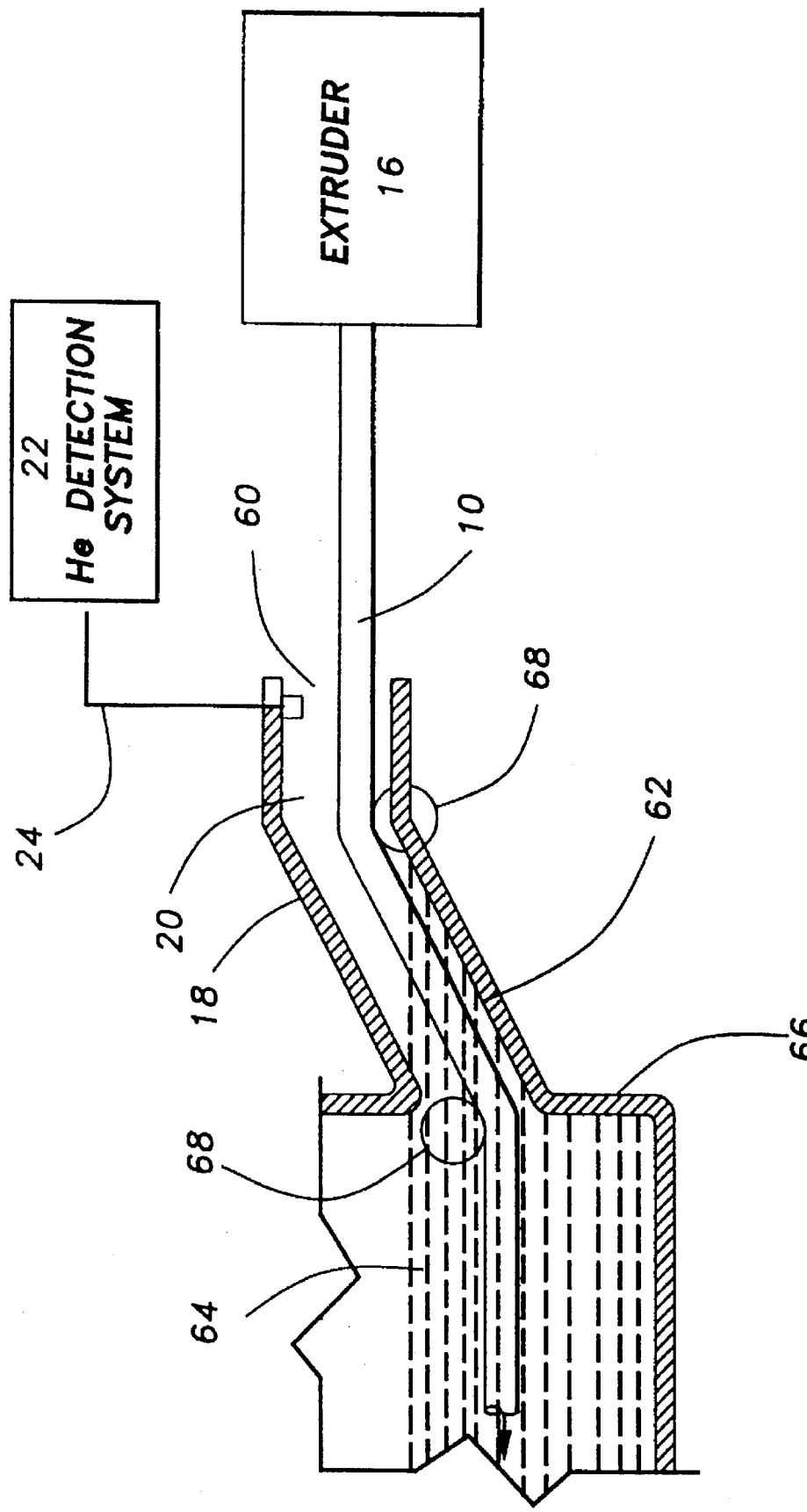
FIG. 3 is a diagrammatic view illustrating a portion of a second preferred embodiment of the present invention.

With reference now to FIG. 3, a preferred embodiment of the inspection housing 18 is thereshown in which an inlet end 60 receives the tubing 10 from the convoluter 16 while an outlet end 62 of the housing 18 is positioned below the water level 64 of a cooling tank 66. Appropriate guide rollers 68 guide the tubing 10 through the housing 18 and the fluid conduit 24 to the helium detector 22 is open adjacent the inlet end 60 of the housing 18.

In operation, any helium which leaks from tubing 10 within the housing 18 passes up through the housing 20 toward the inlet end 60 and to the conduit 24. Thus, the housing 18 integrates any helium escaping from the tubing which insures positive detection by the helium detector 22.

From the foregoing, it can be seen that the present invention provides a simple and yet highly effective method for detecting leaks in tubing formed by extrusion. Having described my invention, however, many modifications thereto will become apparent to those skilled in the art to which it pertains without deviation from the spirit of the invention as defined by the scope of the appended claims.

I claim:

1. Apparatus for testing moving tubing continuously formed by extruding material through an extrusion die, said tubing having an interior formed downstream from the extrusion die, comprising a source of a preselected gas, means for supplying gas from said source into the interior of the tubing downstream from the extrusion die, an elongated inspection housing open at each end, said housing having an inside cross-sectional shaper greater than the cross-sectional shape of the tubing, said tubing passing through said housing, means for detecting the presence of said preselected gas in said housing and generating an output signal representative thereof.

2. The invention as defined in claim 1 wherein said preselected gas essentially comprises helium.

3. The invention as defined in claim 1 and comprising an alarm responsive to said output signal.

4. The invention as defined in claim 1 and comprising a convoluter operatively disposed between the extrusion die and said inspection housing and means for fluidly connecting said convoluter to said detecting means.

5. The invention as defined in claim 1 wherein said detecting means comprises a gas detector and an fluid conduit which fluidly connects said helium detector to the interior of said inspection housing.

6. The invention as defined in claim 1 wherein said means for supplying gas comprises a fluid conduit extending from said gas source and through the die, said fluid conduit having an end open to a downstream side of the die.

7. The invention as defined in claim 1 and comprising a tank filled to a predetermined level with a cooling liquid, wherein said inspection housing has an inlet end which receives the tubing from the die and an outlet end positioned in said tank below said predetermined level.

8. The invention as defined in claim 7 and comprising guide rollers for guiding said tubing through said inspection housing.

9. The invention as defined in claim 7 wherein said detecting means is fluidly connected to said inspection housing adjacent said inlet end of said inspection housing.

* * * * *